United States Patent Office 3,443,113
Patented May 6, 1969

3,443,113
UNDERGROUND ELECTRICAL DISTRIBUTION SYSTEM
Ernest A. Goodman, Churchill Borough, William H. Mutschler, Jr., Bethel Park, and John M. Anderson, Avalon, Pa., assignors to Allis-Chalmers Manufacturing Company, Milwaukee, Wis.
Filed Sept. 19, 1966, Ser. No. 580,319
Int. Cl. H02j 3/00; H01f 27/02; H02g 9/10
U.S. Cl. 307—17
8 Claims

ABSTRACT OF THE DISCLOSURE

In an underground electrical distribution system a flush-mounted vault having a removable cover houses a sealed transformer (removably mounted on the wall or on the floor) and a sealed sectionalizing switch (removably mounted on the wall) each of which is separately removable without disturbing the other. The switch and transformer have their terminal studs located on top so that necessary cables can be removably connected thereto. Grounding means are provided for the two tanks and for a shielded cable interconnecting the switch and transformer. Switch operating means are located on top of the switch tank. A viewing port is also located on top of the switch tank. In some embodiments, a fuse is provided in the transformer tank, in the switch tank, or in a separate sealed housing.

---

This invention relates generally to underground electrical distribution systems and components therefor. More particularly, it relates to improved systems wherein modular components such as transformer, sectionalizing switches and ancillary apparatus are employed in improved arrangements in underground vaults.

In the field of electrical power distribution there is a trend away from overhead distribution systems and toward underground distribution systems for numerous reasons. For example, underground systems are believed to be more aesthetic, particularly in residential areas, because wires and components are out of sight. Furthermore, underground location of conductor lines and components eliminates the chance of outages caused by lightning and icing and protects all components from damage due to accidents and vandalism.

A variety of underground distribution systems with pad-mounted and underground vault type electrical equipment has been developed and is in use but numerous features thereof can be improved upon.

Accordingly, it is an object of this invention to provide improved underground vault type electrical distribution systems and components.

Another object is to provide improved systems utilizing improved arrangements of transformers, sectionalizing switches and ancillary apparatus in underground vaults.

Another object of this invention is to provide improved systems of the aforesaid character which employ the principles of modular construction, in that transformers, switches and other components can be used in various preferred combinations and these same components are adaptable for use in underground, pad-mounted or overhead installations.

Another object is to provide systems of the aforesaid character wherein either the transformer or the switch can be installed in, or removed from, the vault from above without interference from the other.

Another object is to provide systems of the aforesaid character wherein the switch can be manually operated through the top of the vault, wherein means are provided on top of the switch assembly to give a positive visual indication of switch position and wherein conductors can be easily connected or disconnected from the top of the vault.

Another object is to provide systems of the aforesaid character which are more easily and quickly operated and serviced and have inherent safety features.

Other objects and advantages of the invention will hereinafter appear.

The accompanying drawings illustrate several preferred embodiments of the invention, but it is to be understood that the embodiments illustrated are susceptible of modifications with respect to details thereof without departing from the scope of the appended claims.

Figure 1:
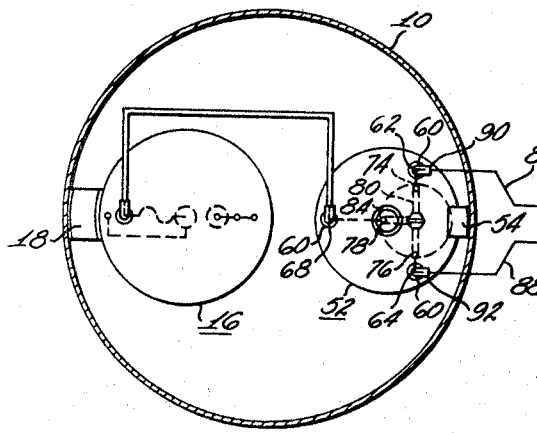
FIG. 1 is a side elevational view, partly in section, of an underground vault showing the transformer assembly, switch assembly and other components mounted therein in accordance with one embodiment of the present invention.

Referring to FIG. 1 which shows a first embodiment of the invention, the numeral 10 designates a tubular or rectangular vault which is buried in the earth and has its access opening at ground level. Vault 10 is provided with a removable cover 12 having a protective baffle 14 on its underside. Vault 10 is preferably made of moisture-proof material such as concrete or coal tar pitch impregnated fiber insulation. Cover 12 is preferably in the form of a metal grate or ventilator and baffle 14 therebelow is adapted to protect components in the vault from debris and insertion of foreign objects, and to improve the circulation of hot vault air to the outside. Cover 12 can be without air openings, in which case the vault would be nonventilated and self-cooling to the surrounding soil and overlaying air, and baffle 14 would be omitted.

Figure 2:
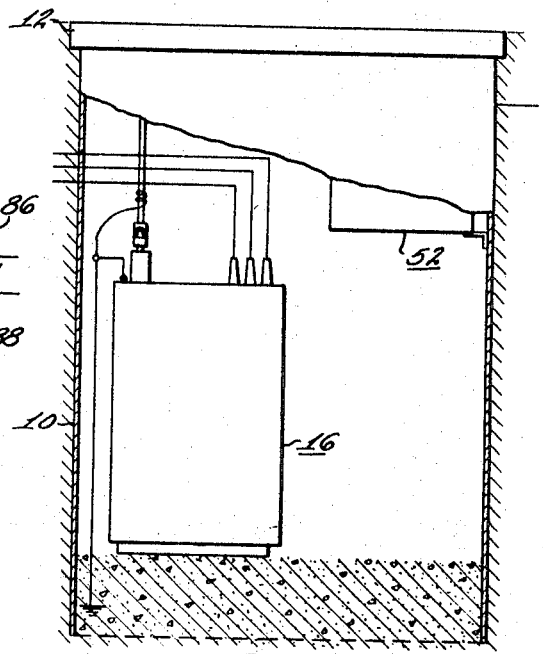
FIG. 2 is a top plan view of the vault and components shown in FIG. 1.

As FIGS. 1 and 2 show, a transformer 16 is located in vault 10 adjacent to one side thereof and is removably mounted on the inside wall of the vault above the floor by bracket means 18. Transformer 16 comprises a metallic oil-filled tank 20 having a cover 22. Cover 22 is provided with insulating bushings 24 through which terminal studs 26, 28, 30 and 32 extend. Tank 20 is provided with grounding connections 34 and 35. Grounding connection 34 is connected to a ground rod 35 driven into the earth beneath vault 10. Transformer 16 further comprises a core and coil assembly 36 located within tank 20 and having a primary winding 38 and a secondary winding 40. A protective fuse 42 is mounted within tank 20. One end of primary winding 38 is grounded to tank 20. The other end of the primary winding is connected to one side of fuse 42 and the other side of the fuse is connected to terminal stud 26. Terminal stud 26 is adapted to mate with an insulated removable connector 27 which, if preferred, may be of a well known type such a number of types made by the Elastic Stop Nut Corporation of America (hereinafter referred to as ESNA type connectors). The ends of secondary winding 40 are connected to the terminal studs 28 and 30. A center tap 44 on secondary winding 40 is connected to terminal stud 32 and ground to tank 20.

Three underground secondary cables 46, 48 and 50 extend into vault 10. The two cables 46 and 48 are connected to the terminal studs 28 and 30, respectively, and cable 50 is connected to the grounded terminal stud 32 of transformer 16.

As FIGS. 1 and 2 further show, a four position sectionalizing switch 52 is located in vault 10 adjacent a side thereof and is removably mounted on the inside wall of the vault above the floor by bracket means 54. Transformer 16 and switch 52 are so mounted with respect to each other that either can be installed or removed without interference from the other. Switch 52 comprises a metallic tank 56 having a cover 58 and filled with a dielectric material, such as insulating oil, askarel, or an insulating gas. Cover 58 is provided with insulating bushings 60 through which terminal studs 62, 64 and 68 extend. The terminal studs 62, 64 and 68 are adapted to mate with ESNA type or similar connectors hereinbefore referred to. Tank 56 is provided with grounding connections 70 and 72 for the cable ground leads and to ground the tank 56 to ground rod 35. Switch 52 further comprises three stationary contacts 74, 76 and 78 located within tank 56 and connected to the terminal studs 62, 64 and 68, respectively. A rotating movable bridging contact 80 is located within tank 56 and is provided with rotatable operating means 82, suitably insulated, which extends through cover 58 of switch 52 and which is adapted for operation by a hotstick. Movable contact 80 is rotatable to any one of four positions which are shown in FIGS. 6 through 9 and hereinafter more particularly described. As a safety feature and a convenience, cover 58 of switch 52 is provided with a viewing port 84 through which the actual position of movable contact 80 can be viewed from the top of vault 10 if the vault cover 12 is removed, and an indicating plate graphically showing the internal switch position and connections.

Two underground primary cables 86 and 88 extend into vault 10 and are provided at their ends with connectors 90 and 92, respectively, such as ESNA type connectors, which connect to the terminal studs 62 and 64 on cover 58 of switch 52. A ground wire 89 is associated with the primary cables 86 and 88 and is grounded to grounding connection 72 on cover 58 of switch 52.

The cable 94 is located within vault 10 and is provided at each end with connectors 96 and 27, such as ESNA type connectors, which connect respectively to terminal stud 68 on switch 52 and to terminal stud 26 on transformer 16. A ground wire 100 is associated with cable 94 and is grounded at one end to grounding connection 70 on cover 58 of switch 52. The other end of ground wire 100 is grounded to grounding connection 34 on transformer 16.

Figure 6:
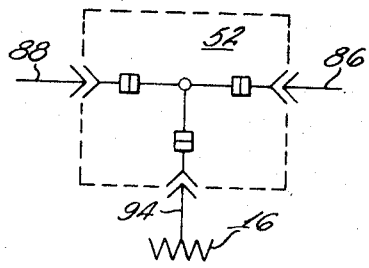
FIGS. 6, 7, 8 and 9 are schematic showings of the four operating positions of the sectionalizing switch assembly.
Figure 7:
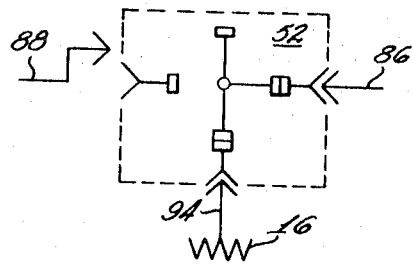
Figure 8:
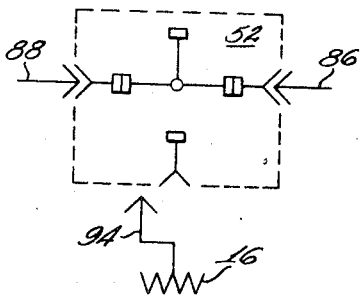
Figure 9:
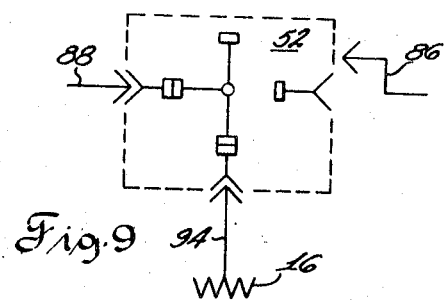

FIGS. 6 through 9 show the operating positions of switch 52 which are required to sectionalize portions of the primary loop and permit the repair of faults in other portions of the loop. FIG. 6 shows the switch position for energizing transformer 16 and completing the primary loop between conductors 86 and 88. In FIG. 7, the transformer is energized from line 86 and the loop is open. In FIG. 8 the transformer is deenergized and the loop is completed. In FIG. 9 the transformer is energized from line 88 and the loop is open. Any terminal may be disconnected after the switch is moved to such a position that the terminal is not carrying load current.

Figure 3:
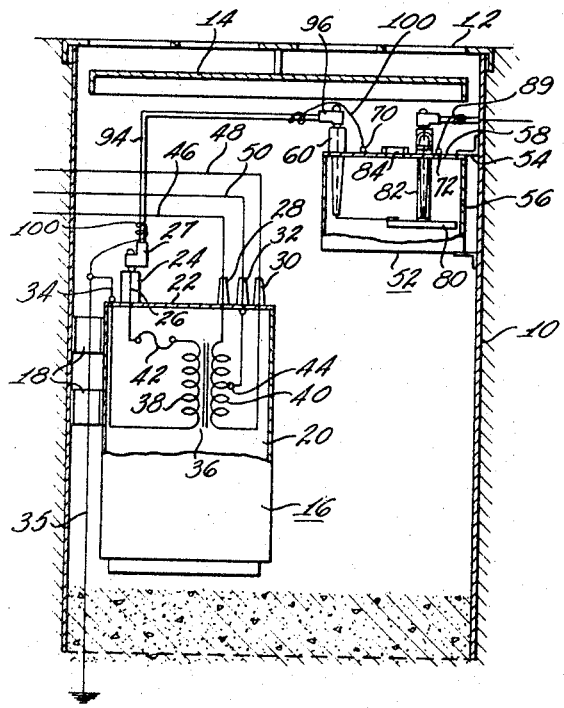
FIG. 3 is a view similar to FIG. 1 but showing a modification in the mounting of the transformer assembly.

FIG. 3 shows an embodiment of the invention wherein transformer 16 is mounted on the floor of vault 10 rather than on the side or wall of the vault.

Figure 4:
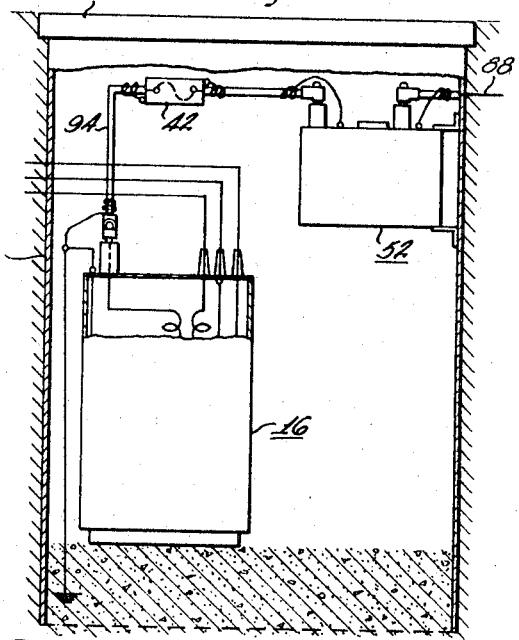
FIG. 4 is a view similar to FIG. 1 but showing a first modification in the mounting of the fuse.

FIG. 4 shows an embodiment of the invention wherein fuse 42 is mounted separately on the inside of vault 10 in a suitable container rather than within tank 20 of transformer 16, as shown in FIG. 1. This provides for ease of accessibility to the fuse.

Figure 5:
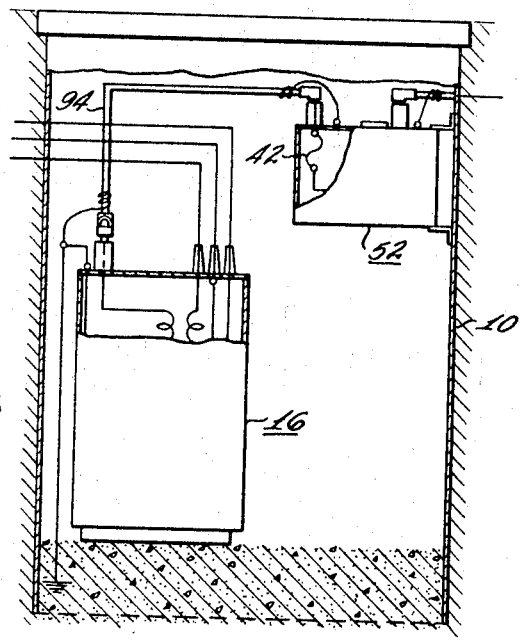
FIG. 5 is a view similar to FIG. 1 but showing a second modification in the mounting of the fuse.

FIG. 5 shows an embodiment of the invention wherein fuse 42 is mounted within tank 56 of switch 52 rather than as shown in FIGS. 1 or 4.

It is to be understood that, if preferred, overload protective means (not shown), such as a secondary breaker, could be employed within tank 20 of transformer 16 to protect transformer 16 against overloads or secondary faults.

The principal advantages of the invention disclosed herein are as follows. Use of the modular concept enables the design and manufacture of transformers, switches, fuses and other components which can be used interchangeably in underground, pad-mounted or overhead distribution systems. The transformers and switches (and fuses, if desired) can be removed from or installed in a vault from above without disturbing or dismantling other components. Underground primary, secondary and interconnecting cables can be easily connected or disconnected from the opening in the top of the vault with savings in time, money and trouble. The sectionalizing switch near the top of the vault can be operated through the top of the vault and, for safety and convenience, actual switch contact position can be viewed closely from the top of the vault.

The embodiments of the invention in which an exclusive property or privilege is claimed are defined as follows:

1. In an underground electrical distribution system,
   a vault disposed in the earth and having an access opening at its top,
   the top of said vault being at ground level,
   a removable cover for said opening in said vault,
   a transformer and a sectionalizing switch located in said vault in such position with respect to each other so that each can be installed or removed through said opening without interference from the other,
   said transformer comprising a tank suitably sealed with a primary and a secondary winding therein,
   a plurality of terminal studs extending through insulating bushings on said transformer tank,
   said primary winding having one end grounded to said transformer tank and having its other end connected to one of said terminal studs,
   said switch comprising a sealed tank with a plurality of stationary contacts and a movable bridging contact therein,
   a plurality of terminal studs extending through insulating bushings on the top of said switch tank,
   each of said stationary contacts being connected to one of said terminal studs of said switch,
   operating means extending through the top of said switch tank for moving said movable bridging contact,
   a plurality of underground primary cables and secondary cables having ends extending into said vault,
   each of said primary cables having a connector on the end thereof,
   the connector on the ends of said primary cables being removably connected to studs on said switch and the ends of said secondary cables being connected to studs or cables on said transformer,
   a cable in said vault having connectors on each end and detachably connected to a stud on said switch and a stud on said transformer,
   ground wires associated with said primary cables and for ground connections to said transformer tank and said switch tank, and
   a ground rod located in said vault and connected to earth, to said ground wires and to said tanks.

2. A system according to claim 1 wherein said switch is removably mounted on the wall of said vault, and said transformer is on the vault floor.

3. A system according to claim 2 wherein both said switch and said transformer are removably mounted on the wall of said vault.

4. A system according to claim 1 wherein said switch comprises a viewing port near the top thereof through which switch contact position can be viewed through the opening in said vault.

5. A system according to claim 1 including a fuse in series circuit with the primary winding of said transformer.

6. A system according to claim 5 wherein said fuse is mounted in said transformer tank.

7. A system according to claim 5 wherein said fuse is mounted in said switch tank.

8. A system according to claim 5 wherein said fuse is contained in a suitable separate enclosed container mounted on the wall of said vault.

References Cited
UNITED STATES PATENTS

| | | | |
|---|---|---|---|
| 3,287,566 | 11/1966 | Lang et al. | 307—17 |
| 3,377,487 | 4/1968 | McNulty | 307—17 |
| 3,341,718 | 9/1967 | Acker | 307—17 X |

ROBERT K. SCHAEFER, *Primary Examiner.*

H. J. HOHAUSER, *Assistant Examiner.*

U.S. Cl. X.R.

174—38; 307—149; 336—90